United States Patent [19]

Solberg

[11] 4,067,635
[45] Jan. 10, 1978

[54] PLUG HOLDER FOR HEAD BOLT HEATERS

[76] Inventor: Dean C. Solberg, Box 74, Towner, N. Dak. 58788

[21] Appl. No.: 776,712

[22] Filed: Mar. 11, 1977

[51] Int. Cl.² .......................... B60D 1/08; B60L 1/02; H01R 13/60
[52] U.S. Cl. ............................... 339/119 R; 219/205; 280/422; 339/10
[58] Field of Search ................. 339/10, 119 R, 119 C, 339/106; 248/226.2, 229, 291, 316 A; 219/205–207; 280/421, 422

[56] References Cited

U.S. PATENT DOCUMENTS

| | | | |
|---|---|---|---|
| 1,759,389 | 5/1930 | Bowen | 219/205 |
| 2,000,825 | 5/1935 | Davies | 219/205 |
| 2,717,305 | 9/1955 | Guthrie | 219/205 |
| 2,731,935 | 1/1956 | Aves | 248/229 X |
| 3,330,935 | 7/1967 | Wells | 219/205 |
| 3,342,441 | 9/1967 | Danielson | 248/316 X |

Primary Examiner—Roy Lake
Assistant Examiner—E. F. Desmond
Attorney, Agent, or Firm—Robert E. Kleve

[57] ABSTRACT

The invention comprises a holder or support for the outlet plug of an electric heater for an engine of a vehicle. The holder has a pair of parallel plates adapted to be fixed on opposite sides of a front bumper of the vehicle. A pivotally mounted plate is pivotally mounted to one of the parallel plates which may be pivoted to lock it in a selected position depending upon the configuration of the front portions of the vehicle. The pivotally mounted plate has a hole therethrough to receive the prongs of the outlet plug of the heater. The pivotally mounted plate also has clamping means to clamp the plug to the plate when the plug is mounted in the hole in the plate with the prongs projecting forward to receive an extension cord plug to provide current to the heater.

1 Claim, 3 Drawing Figures

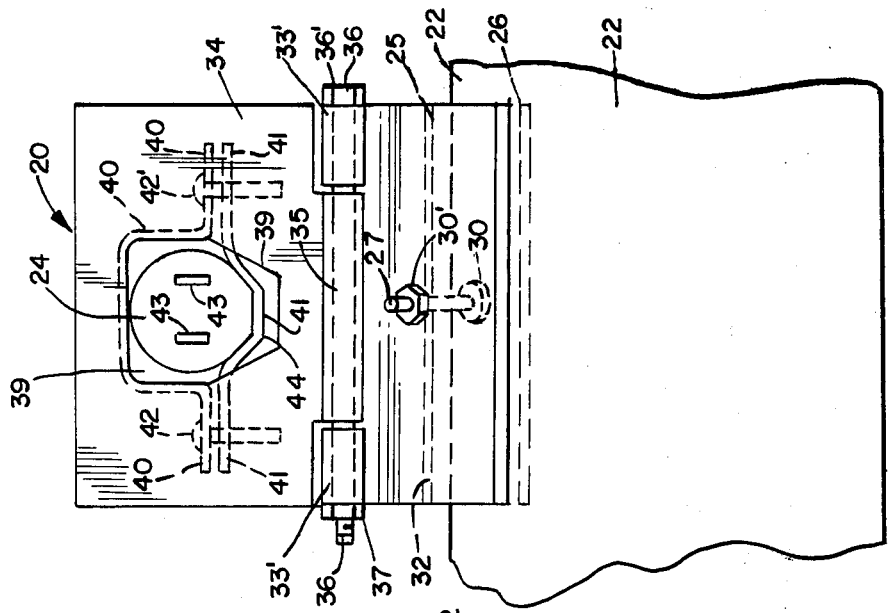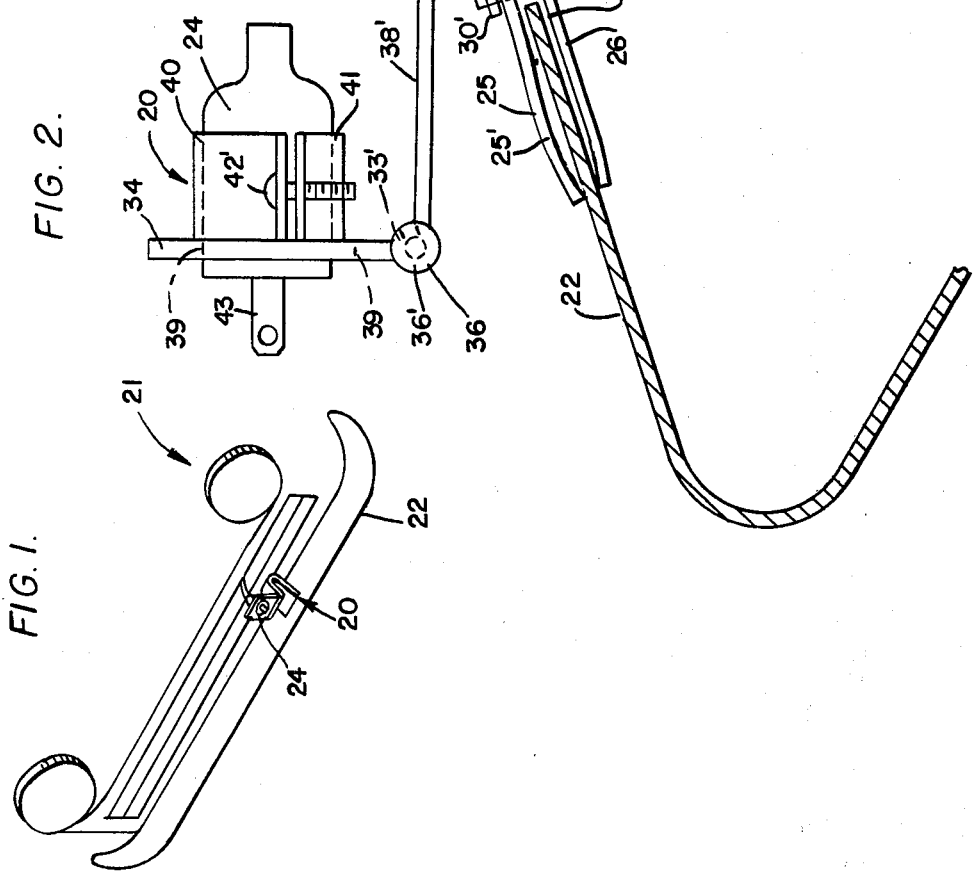

PLUG HOLDER FOR HEAD BOLT HEATERS

This invention relates to head bolt heaters, more particularly, the invention relates to a head bolt heater plug support or holder.

It is an object of the invention to provide a novel holder for holding the outlet plug of the cord of a head bolt heater in a fixed position on the front bumper of an automobile.

It is another object of the invention to provide a novel support or holder which holds the outlet plug of a cord of a head bolt heater in a fixed position upon the front bumper of an automobile which is adjustable to different positions and which can be mounted to bumpers of automobiles with various types of grill configurations.

Further objects and advantages of the invention will become apparent as the description proceeds and when taken in conjunction with the accompanying drawing wherein.

FIG. 1 is a perspective view of the novel support holder shown attached to the front bumper of an automobile with the outlet plug of the cord of a head bolt heater attached to the support.

FIG. 2 is an enlarged side elevational view of the head bolt heater plug support shown attached to a front bumper with the outlet plug attached to the support.

FIG. 3 is an enlarged front elevational view of the head bolt heater plug support shown attached to a bumper with the outlet plug attached to the support.

Briefly stated, the invention comprises a support or holder for mounting to the front bumper of an automobile, which has a pair of parallel plates to engage on opposite sides of the front bumper of an automobile, a pivotally mounted plate pivotally mounted above the parallel plate, and lockable in a fixed positon, said pivotally mounted plate has a hole therethrough to receive the outlet plug of a head bolt heater, and clamping means to clamp the plug to the plate, with the prongs of the plug projecting forward through the hole in the plate for receiving mating plug ends of an electric extension cord so that electric current can be carried through the extension cord to the heater.

Referring more particularly to the drawing, in FIGS. 1, 2, and 3 the outlet plug holder or support 20 is shown mounted to the front bumper 21 on an automobile 22, the electric cord 23 is connected to a conventional head bolt heater mounted in the engine of the automobile 22. The cord 23 has an outlet plug 24.

The outlet plug holder or support 20 has a front metal plate 25 and a second metal plate 26. A bolt 27 passes through bores 28 and 28' in the plates 25 and 26 with the bolt 27 which has an enlarged head portion 30 which is larger than the bores 28 and 28'. A nut 30' is threaded onto the other end of the bolt 27 which nut is also larger than the bores 28 and 28' so that the nut may be tightened or threaded toward the head of the bolt to tighten the plates 25 and 26 together with the upper surfaces 21' of the bumper 21 therebetween to thereby lock the plates 25 and 26 to the bumper 21.

The upper plate 25 which is made of steel has a forward portion 25' which when the nut 27 is tightened causes the upper plate to at least partially flex and flatten out against the upper surface of the bumper to provide a frictional resilient locking action against the bumper. The lower plate 26 is also made of steel and has L-shaped ridge 32 at one end so that as the nut 27 is tightened it draws the head of the bolt toward the bumper causing the main portion 26' of the lower plate to flex inward with the resilience of the plate producing a resilient locking action of the plate 26' to the bumper.

The plate 25 has a pair of reversely bent upper and outer flanges 33 and 33' which act as sleeves or bearings. A pivotally mounted plate 34 has a centrally lower reversely bent flange 35 which also acts as a sleeve or bearing. A bolt 36 passes through the center of sleeve or bearing 26 and through the center of the sleeve 35 to pivotally mount the plate 34 to the plate 26. A nut 37 is threaded onto the outer end of bolt 36 to be threaded against the one flange 33 and draws the head 36' of the bolt 36 against the flange 33' to draw the sleeve 33 and 33' against the sleeve 35 to lock the sleeve together to thereby lock the plate 34 in an adjusted position relative to plate 25.

The plate 25 has a reversely bent portion 38 and extends forwardly a substantial distance having a considerably long portion 38' so that the plate 26 can extend in front of the grill of different automobiles and clear the grill since in some automobiles the grill extends further forward than in others.

The plate 34 has a hole 39 therethrough. A curved plate 40 is welded to the back of plate 34. A reversed curved plate 41 is attached to the curved plate 40 by a pair of screws 42 and 42' threaded into plates 41 and 41 so that the plug 24 of the head bolt heater may be inserted between the plate 40 and 41 with the prongs 43 of the plug 24 projecting wardly of the plate 34, as illustrated in FIGS. 2 and 3 and the screws 42 and 42' may be turned to draw or thread the plate 41 upward toward plate 40 drawing and tightening the plate 41 against the plug 24 to lock the plug 24 to the plate 34, as illustrated in FIGS. 2 and 3.

An extension cord (not shown) may be plugged in at one end to a source of electric current. Its plug at the other end which will mate with the plug 24, may be attached to the plug 24 at the front of the plug 24 to provide a source of electric current through the extension cord and through the plug 24 into the head bolt heater in the engine of the automobile 22.

The hole 39 may be made in varying sizes and will be made large enough to accomodate or receive various sizes of plugs 24. The lower plate 41 has a relatively sharper curved portion 44 than plate 40 to engage against the under surface of the plug 24 so as to tend to bite into the plug 24 to more firmly lock plugs of different sizes to the plate 34 in their adjusted positions.

Thus, it will be seen that a novel holder or support has been provided for holding the outlet plug of a heab bolt heater in a fixed position on the front bumper of an automobile so that the plug and cord of the heater will not swing around loose.

Also the forwardly extending portion 38' and the ability to adjust the plate 34 to different adjusted positions about the axis of the bolt 36 and to lock the plate 34 in its adjusted position enables the holder or support to be adapted to various different types of automobiles or vehicles.

It will be obvious that various changes and departures may be made to the invention witout departing from the spirit thereof and accordingly it is not intended that the invention be limited to that specifically described in the specification or as illustrated in the drawings but only as set foth in the appended claims wherein:

What is claimed is:

1. A holder for the outlet plug of an electric heater for an engine of a vehicle comprising a pair of parallel plates adapted to be locked on opposite sides of the surfaces of a front bumper of the vehicle, a pivotally mounted plate pivotally mounted at its lower end to one of the parallel plates, locking means to lock the pivoting mounted plate to said one of said parallel plates in an adjusted position, said pivotally mounted plate having a hole therethrough, clamping means on said pivotally mounted plate, whereby the outlet plug may be inserted between the clamping means with the prongs projecting through the hole in the pivotally mounted plate and the clamping means may be actuated to lock the plug to the plate to thereby lock the plug at a fixed position on the bumper of the vehicle, whereby an extension cord plugged in at one end to a source of electric current may be plugged in at its other end to the plug to provide current through the extension cord and through the plug to the heater for the engine of the vehicle.

* * * * *